United States Patent
Obregon et al.

(10) Patent No.: US 10,148,521 B2
(45) Date of Patent: Dec. 4, 2018

(54) CAPACITY PLANNING IN A BACKBONE NETWORK

(71) Applicant: Facebook, Inc., Menlo Park, CA (US)

(72) Inventors: Josue Israel Kuri Obregon, Sunnyvale, CA (US); Nicolas Emilio Stier Moses, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 223 days.

(21) Appl. No.: 15/215,328

(22) Filed: Jul. 20, 2016

(65) Prior Publication Data

US 2018/0026850 A1 Jan. 25, 2018

(51) Int. Cl.
*G06F 15/173* (2006.01)
*H04L 12/24* (2006.01)
*G06Q 30/02* (2012.01)

(52) U.S. Cl.
CPC ....... *H04L 41/145* (2013.01); *G06Q 30/0283* (2013.01); *H04L 41/147* (2013.01); *H04L 41/22* (2013.01)

(58) Field of Classification Search
CPC ..... H04L 41/145; H04L 41/147; H04L 41/22; G06Q 30/0283
USPC ....................................................... 709/203
See application file for complete search history.

(56) References Cited

U.S. PATENT DOCUMENTS

| | | | | |
|---|---|---|---|---|
| 5,216,591 A | * | 6/1993 | Nemirovsky | .... G06Q 10/06316 370/238 |
| 5,404,451 A | * | 4/1995 | Nemirovsky | ....... H04L 41/0826 370/238 |
| 5,999,103 A | * | 12/1999 | Croslin | ............... H04M 3/2254 370/225 |
| 6,052,796 A | * | 4/2000 | Croslin | .................. H04L 45/22 370/225 |
| 6,744,727 B2 | * | 6/2004 | Liu | ...................... H04O 3/0079 370/217 |
| 7,680,055 B1 | * | 3/2010 | Ramakrishnan | .... H04L 41/0896 370/238 |
| 7,903,564 B2 | * | 3/2011 | Ramakrishnan | ........ H04L 41/12 370/216 |
| 8,913,481 B2 | * | 12/2014 | Akyamac | ............ H04J 14/0284 14/284 |

(Continued)

OTHER PUBLICATIONS

Labovitz, Craig et al. "Experimental Study of Internet Stability and Wide-Area Backbone Failures". 1998. pp. 1-22. (Year: 1998).*

(Continued)

*Primary Examiner* — Imad Hussain
(74) *Attorney, Agent, or Firm* — FisherBroyles, LLP

(57) ABSTRACT

A system and method for fault-tolerant and long-term network capacity planning is disclosed. The system receives projected data, such as available network supply and network demand, characterizing a backbone network for a set of time periods. The system also receives failure data describing different failure scenarios that may occur. Based on the received network characterization data the system generates a capacity provisioning plan, describing how capacity is added to the backbone network over time, that satisfies the network demand of each time period while providing fault-tolerance under any of the failure scenarios described in the failure data. The capacity provisioning plan is also optimized, based on cost data associated with the backbone network, to minimize total costs.

20 Claims, 15 Drawing Sheets

(56) References Cited

U.S. PATENT DOCUMENTS

| | | | | |
|---|---|---|---|---|
| 2002/0052936 A1* | 5/2002 | Gai | ...................... | H04L 12/462 709/220 |
| 2002/0097680 A1* | 7/2002 | Liu | ...................... | H04Q 3/0079 370/238 |
| 2004/0083277 A1* | 4/2004 | Chaporkar | .............. | H04L 41/12 709/220 |
| 2005/0197993 A1* | 9/2005 | Korotky | .............. | H04J 14/0284 14/284 |
| 2005/0226400 A1* | 10/2005 | Farber | ............... | H04M 15/8044 379/114.01 |
| 2007/0286202 A1* | 12/2007 | Dos Remedios | ... | H04L 41/5019 370/395.2 |
| 2008/0037552 A1* | 2/2008 | Dos Remedios | ... | H04L 41/0896 370/395.21 |
| 2009/0003211 A1* | 1/2009 | Akyamac | ............ | H04J 14/0284 14/284 |
| 2010/0097928 A1* | 4/2010 | Ramakrishnan | .... | H04L 41/0896 370/221 |
| 2010/0262446 A1* | 10/2010 | Sticker | ................... | H04L 45/12 709/227 |
| 2011/0085467 A1* | 4/2011 | Puthenpura | ......... | H04L 41/5041 370/254 |
| 2015/0055477 A1* | 2/2015 | Narendran | ............. | G06Q 30/06 370/235 |

OTHER PUBLICATIONS

Sengupta, Sudipta et al. "Switched Optical Backbone for Cost-Effective Scalable Core IP Networks". 2003. IEEE. pp. 1-11 (60-70). (Year: 2003).*

Das, Saurav et al. "Rethinking IP Core Networks". 2013. Optical Society of America. pp. 1-12. (Year: 2013).*

Ramamurthy, Byrav et al. "Balancing Cost and Reliability in the Design of Internet Protocol Backbone Using Agile Optical Networking". 2014. IEEE. pp. 1-16 (427-442). (Year: 2014).*

Economides, Nicholas. "The Economics of the Internet Backbone." 2005. pp. 1-58. (Year: 2005).*

\* cited by examiner

Demand

| Source | Destination | Qtr | Tot_BB_Gbps |
|--------|-------------|--------|-------------|
| VXA | VXJ | 2016Q1 | 3 |
| VXA | VXM | 2016Q1 | 33 |
| VXD | VXJ | 2016Q1 | 3 |
| VXD | VXM | 2016Q1 | 21 |
| VXE | VXJ | 2016Q1 | 1 |
| VXE | VXM | 2016Q1 | 8 |
| VXA | VXJ | 2016Q2 | 5 |
| VXA | VXM | 2016Q2 | 36 |
| VXD | VXJ | 2016Q2 | 2 |
| VXD | VXM | 2016Q2 | 24 |
| VXE | VXJ | 2016Q2 | 1 |
| VXE | VXM | 2016Q2 | 13 |
| VXA | VXJ | 2016Q3 | 5 |
| VXA | VXM | 2016Q3 | 36 |
| VXD | VXJ | 2016Q3 | 2 |
| VXD | VXM | 2016Q3 | 24 |
| VXE | VXJ | 2016Q3 | 1 |
| VXE | VXM | 2016Q3 | 13 |

*FIG. 6*

Failures

| Failure ID | Description | Scenario | Failure list | | |
|---|---|---|---|---|---|
| Fail1 | Atlantic Undersea Cable Failure | A | CAB16:S3 | CAB1:S10 | CAB1:S13 | CAB11:S19 |
| Fail2 | London Power Failure | AB | CAB1:S8 | CAB7:S5 | CAB7:S8 | |
| Fail3 | Portland, OR Earthquake | B | CAB10:S10 | CAB11:S9 | CAB7:S5 | CAB1:S10 |

*FIG. 7*

CAPACITY PLANNING IN A BACKBONE NETWORK

BACKGROUND

Some entities, such as large corporations, government agencies, or universities, may maintain backbone networks to interconnect entity assets. For example, a corporate backbone network may be used to connect different data centers maintained by a corporation. Backbone networks may additionally include one or more points of presence for connecting the backbone network to the Internet. Backbone networks are themselves made up of connectivity devices, such as hubs, switches, and routers, as well as cables to connect the connectivity devices. These components of the backbone network provide the network capacity by which the data communications demand between assets (e.g., between data centers or computing devices) may be satisfied.

In order to increase backbone network capacity, an entity's network planners may engage in both short-term operational planning and long-term strategic planning. In the short-term, network planners may, for example, acquire additional capacity from an existing cable in the backbone network that has unused capacity, such as by paying for increased cable capacity. In the long-term, network planners may utilize new cables in the backbone network, thereby adding new routes between data centers in the network or augmenting existing routes between data centers.

Traditionally, the long-term planning done by network planners has been driven by the availability of new supply. That is, as new cables have been laid, network planners have had to decide whether to negotiate for use of the new cables, either through leasing access to the cables or joining a consortium of entities that manage the cables. These decisions have typically been made by network planners based on the current network demands of their backbone networks. In other words, the decisions behind long-term strategic planning have been made by network planners based primarily on the state of the backbone network at that particular time. Such limited input into long-term decision making is inherently inefficient, and risks the ability of the backbone network to meet future network demands. It would therefore be beneficial to facilitate the long-term strategic planning of a backbone network.

BRIEF DESCRIPTION OF THE DRAWINGS

FIG. 6 is a table diagram illustrating example demand data, characterizing traffic needs of a backbone network, used by the network capacity planning system.

FIG. 7 is a table diagram illustrating example failure data, specifying failure scenarios for evaluation, used by the network capacity planning system.

The techniques introduced here may be better understood by referring to the following Detailed Description in conjunction with the accompanying drawings, in which like reference numerals indicate identical or functionally similar elements.

DETAILED DESCRIPTION

Figure 1:
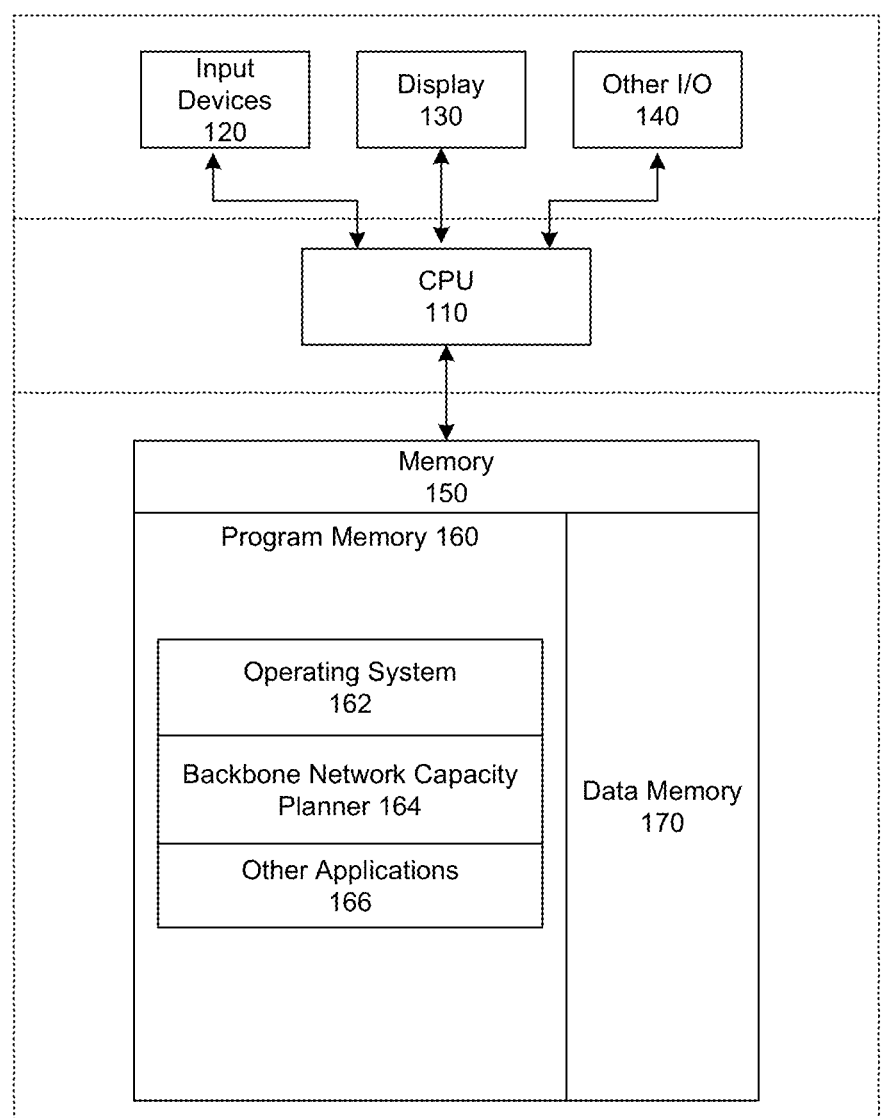
FIG. 1 is a block diagram illustrating an overview of devices on which some implementations can operate.

Embodiments for facilitating long-term capacity planning for backbone networks over various network conditions are described. A network capacity planning system evaluates data characterizing various aspects of a backbone network. As described herein, the data characterizes the demand between nodes of the backbone network, the available supply from cables in the backbone network, and the cost of operating the backbone network at different levels of provisioned capacity. The supply, demand, and cost data may describe the current network state (e.g., the current demand between two nodes), as well as projected values for future time periods (e.g., the projected demand between two nodes for different time intervals extending some time into the future). The network capacity planning system additionally evaluates data describing potential failure scenarios in the backbone network. For example, the failure data may include scenarios describing the cables anticipated to fail in the event of natural disasters (e.g., earthquakes), accidents (e.g., severed by a ship anchor or fishing trawler), or other events that could compromise cable connectivity.

Based on the network characterization data and failure data, the network capacity planning system generates a capacity-provisioning plan that provides guidance regarding how much capacity is needed, and when that capacity should be provisioned (e.g., leased or built-out) from cables in the backbone network. The generated capacity-provisioning plan may satisfy various constraints. For example, the capacity-provisioning plan, as implemented over the future time periods, satisfies network demand during each time period, provides fault-tolerance, and minimizes costs.

A network planner may utilize the network capacity planning system to evaluate different possible scenarios, to evaluate the optimal capacity planning for each scenario, and to select a scenario to adopt based on the corresponding optimized plans. For example, a network planner may be decided whether to invest in a new cable in a backbone network. The network planner may use the network capacity planning system to evaluate a "baseline" scenario that models the backbone network without the addition of the cable being considered. The network planner may also use the network capacity planning system to evaluate an "investment" scenario that models the backbone network with the addition of the new cable. Based on the analysis performed by the system, which provides optimized characterizations of the network under each scenario, including total cost, network capacity shortfalls, unused network capacity, and other characteristics as described herein, the network planner may make an informed decision regarding which scenario to adopt. For example, the network capacity planning system may indicate that it is preferable to invest in the new cable if avoiding network capacity shortfalls is the primary consideration, and preferable not to invest in the cable if costs are the primary consideration. Other scenarios may be modeled, such as to which points in the backbone network a new cable should be connected, or how much capacity should be provisioned from the new cable.

The network planner may also utilize the network planning system to suggest alternative scenarios. For example, in addition to being provided with different scenarios corresponding to alternative network changes being evaluated (e.g., what cables to add to the backbone network), the network capacity planning system may identity cables could be invested in or added to the backbone network, and additionally evaluate an associated scenario that provides the network planner with an alternative scenario.

A backbone network "node," as used herein, refers to an asset interconnected by the backbone network or an interconnection point within the backbone network. For example, a node may represent a data center, a point of presence, or other computing device or interconnection point connected by the backbone network. As described herein, nodes have demand requirements with respect to other nodes based on the network traffic requirements as between the nodes.

A backbone network "cable," as used herein, refers to a physical communication link that enables data communication routes, or "links," between sets of nodes in the backbone network. A cable may be implemented, for example, as an optical fiber cable, copper-based cable, or other physical cable used in data networks. A cable may also refer to a point-to-point wireless connection, such as through a satellite or other means. Each cable may enable routes between multiple nodes (e.g., from node A to node B, and from node A to node C). As described herein, a cable may have a maximum available capacity, a provisioned capacity to which an entity is entitled, and a utilized capacity. Cables may additionally be characterized by their asset type. In some implementations, for example, each cable is characterized as either a lease or an investment. Cables are themselves composed of "segments," at least some of which represent a point-to-point undivided path. Multiple routes within a cable, each to different backbone network nodes, may traverse a common segment. In other words, a segment may provide connectivity for multiple routes.

The demand data characterizes the expected traffic demand between different nodes in the backbone network. In some implementations, the demand data reflects the worst-case traffic projections between nodes.

The supply data characterizes the available supply in the backbone network. In some implementations, the supply data includes existing cables in the backbone network, as well as proposed or contemplated cables to be added to the backbone network. The supply data indicates, for at least some of the cables, the amount of capacity that is available over that cable.

The cost data characterizes the costs associated with each cable in the backbone network. In some implementations, the cost associated with a cable includes an upfront cost corresponding to when the cable becomes and a recurring cost corresponding to each time period that the cable is utilized by the entity. The upfront and recurring costs may further comprise a fixed amount for the cable as well as a variable amount that depends on a capacity of the cable. For example, the upfront variable amount and the recurring variable amount may depend on the amount of cable capacity provisioned by the entity.

The failure data includes different failure scenarios to be evaluated by the system. Each failure scenario lists one or more segments to be treated as failing for that scenario. For example, a failure scenario corresponding to a trawler accident in the Atlantic Ocean may list one more segments belonging to trans-Atlantic cables, and a failure scenario corresponding to a severe earthquake in the United States may list one or more segments belonging to cables located near the earthquake. A failure scenario may also correspond to a potential site failure, such as the failure of all cables connected to a location. In some implementations the failure data also includes, in addition to failure scenarios modeled on particular accidents or natural disasters, additional failure scenarios to be evaluated by the system. For example, the failure data may include failure scenarios that collectively list all single-segment failures, all two-segment failures, etc. In some implementations, for example, the failure data includes failure scenarios corresponding to all two-segment failures from cables characterized as an investment. When evaluating the network under a particular failure scenario, the system treats those cables that are composed of the segments listed for that failure scenario as unable to provide any capacity.

The characterization data evaluated by the system includes projected data for time periods of a fixed or variable interval. In some implementations, for example, the network characterization data may comprise supply and demand projections for every year, half-year, or fiscal quarter. The network characterization data includes projections for time periods that extend a number of years beyond the present time (e.g., 5 years out, 10 years out, 15 years out, etc.).

The network capacity planning system evaluates the network characterization data and failure data to generate a capacity provisioning plan that satisfies the network demands between nodes for the various time periods, is robust in the presence of failures, and minimizes costs. Different sets of characterization data and failure data, corresponding to different scenarios, may be provided to and evaluated by the system. For example, a network planner may evaluate a "baseline" scenario that reflects a current state of the backbone network, as well as alternative scenarios that reflect different network topologies being considered (e.g., whether to add a new cable, and how that cable should connect to the existing backbone network), different cost data forecasts, different demand projections, etc. In some implementations the generation of the provisioning plan comprises a first phase that plans how to route traffic in the network to satisfy demand for at least some of the time periods, and a second phase that optimizes how the capacity needed to satisfy the planned flow should be added (or provisioned) so as to minimize costs. As described herein, the capacity provisioning optimization phase may consider the entire set of time period-planned routes while generating a plan for how capacity should be provisioned for at least some of the time periods. In other words, the system may generate a capacity provisioning plan broken down fiscal quarter by fiscal quarter, optimized with respect to an overall 10-year plan.

The disclosed system has several advantages. Although some of those advantages are described in this disclosure, not all advantages are required in each implementation of the network capacity planning system. Additionally, some advantages will become apparent to those having ordinary skill in the art after reviewing the disclosure. One advantage of the system is that it enables effective long-term planning by evaluating long-term projections regarding network demand, supply, and costs. By generating a plan implemented over a long duration (e.g., every fiscal quarter for ten years), the system can realize certain efficiencies over alternative short-term planning. For example, the system can evaluate the amortization of capital expenditures over the time periods of the provisioning plan, thereby recognizing when it would be less expensive to utilize a leased cable or invest in a new cable. Another advantage of the system is that it evaluates how the network would respond to different failure scenarios. By doing so, the system may generate a capacity provisioning plan that constitutes to satisfy network demand even if a cable suffers a failure. The system is also able to consider inter-temporal constraints in developing an optimized network capacity provisioning plan, such as requiring non-decreasing capacity of certain cables.

Suitable Environments

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that performs long-term capacity planning for a backbone network. Device 100 can include one or more input devices 120 that provide input to the CPU (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, backbone network capacity planner 164, and other application programs 166. Memory 150 can also include data memory 170 that can include network demand data, network supply data, network cost data, failure scenario data, capacity provisioning plans and other generated reports, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
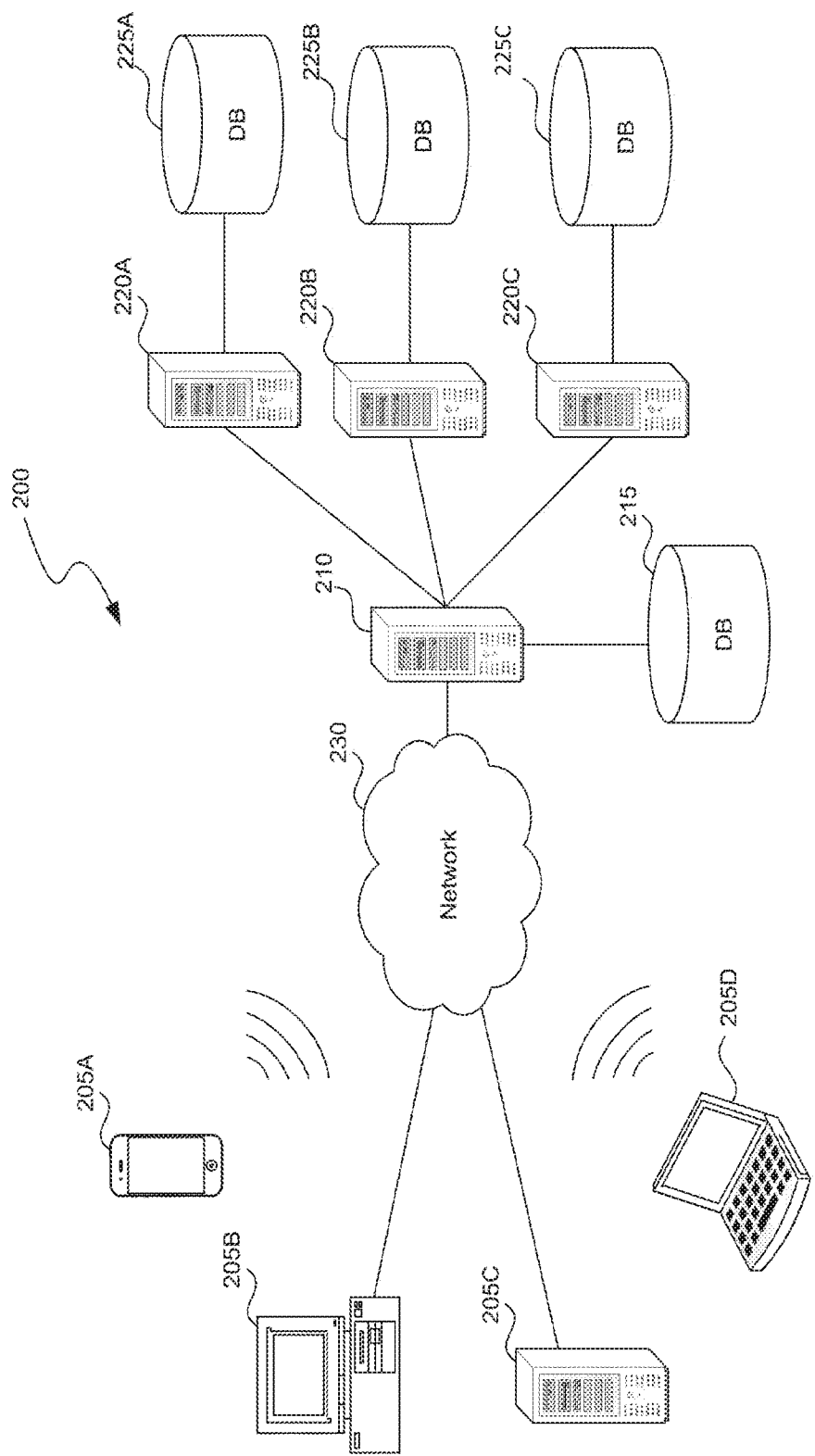
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205A-D can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220A-C can comprise computing systems, such as device 100. Though each server computing device 210 and 220A-C is displayed logically as a single server, server computing devices can each be a distributed computing environment encompassing multiple computing devices located at the same or at geographically disparate physical locations. In some implementations, each server 220A-C corresponds to a group of servers.

Client computing devices 205A-D and server computing devices 210 and 220A-C can each act as a server or client to other server/client devices. Server 210 can connect to a database 215. Servers 220A-C can each connect to a corresponding database 225A-C. As discussed above, each server 220A-C can correspond to a group of servers, and each of these servers can share a database or can have their own database. Databases 215 and 225 can warehouse (e.g. store) information such as network demand data, network supply data, network cost data, failure scenario data, capacity provisioning plans, and other generated reports. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205A-D can be connected to network 230 through a network interface, such as by wired or wireless communication. While the connections between server 210 and servers 220A-C are shown as separate connections, these connections can be any kind of local, wide area, wired, or wireless network, including network 230 or a separate public or private network.

Figure 3:
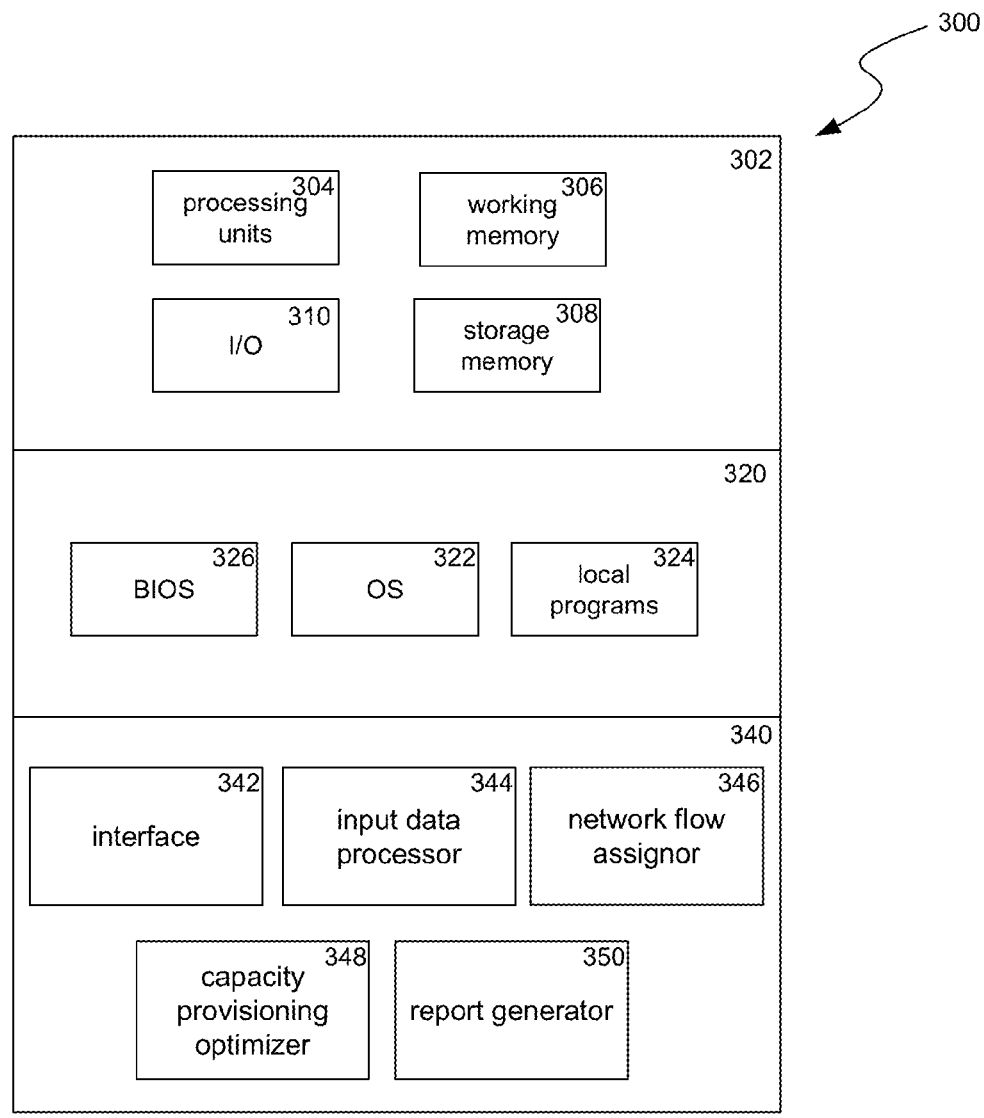
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. Components 300 can be implemented in a client computing device such as client computing devices 205A-D or on a server computing device, such as server computing device 210 or 220A-C.

General software 320 can include various applications including an operating system 322, local programs 324, and a basic input output system (BIOS) 326. Specialized components 340 can be subcomponents of a general software application 320, such as local programs 324. Specialized components 340 can include input data processor 344, network flow assignor 346, capacity provisioning optimizer 348, report generator 350, and components which can be used for transferring data and controlling the specialized components, such as interface 342. In some implementations, components 300 can be in a computing system that is distributed across multiple computing devices or can be an interface to a server-based application executing one or more of specialized components 340.

The input data processor 344 can be configured to receive and process input data, such as network data characterizing a backbone network and costs associated with the backbone network, as well as failure data describing different failure scenarios to be evaluated. The network characterization data describes different aspects of a backbone network. For example, the network characterization data may describe the projected demand between nodes in a backbone network, the projected available supply over existing and future cables within the backbone network, and the costs associated with building out and operating the backbone network at different levels of capacity. The network characterization data may additionally include projected values for future time periods. The network characterization data and failure data may, for example, be received from a user of the system wishing to evaluate how capacity should be added to the backbone network over time. Once received, the input data processor may validate the input data to verify that the data is complete and consistent. For example, the input data processor may verify that the data includes supply and demand values for the entire time period to be evaluated. As a further example, the input data processor may verify that the failure data does not list any segments not defined in the network characterization data. The input data may be formatted for used by the rest of the system. For example, the input data may be received in the form of a spreadsheet, a table, a text document of comma-separated values, or some other human-readable format utilized by network planners using the system, and formatted into an internal format for system use.

The network flow assignor 346 can be used to determine how network flow may be routed through the cables in the backbone network, characterized by the input data, for at least some of the time periods projected in the input data. Each time period's flow assignment is based on the time period's demand between nodes and available supply provided by the cables. That is, the network flow assignor evaluates a time period's demand between each pair of nodes in the backbone network and determines how much supply should be utilized, at each of the cables of the backbone network, to satisfy the demand needs of all nodes. The utilized supply of each cable, however, may not exceed the available supply at that time period for the cable.

The network flow assignor 346 may additionally assign flow for a time period based on the failure scenarios described in the failure data. For example, to assign network flow for a time period, the network flow assignor may evaluate the impact of each failure scenario on the ability of cables in the backbone network to provide supply. As each failure scenario is considered, the network flow assignor may treat cables composed of failing segments as unable to supply any capacity, and may therefore assign no flow to those cables. The network flow assignment for a time period may be robust enough to satisfy all of the failure scenarios in the failure data. For example, in order to achieve robustness, the network flow assignor may assign to each cable the maximum flow for that cable based on each of the evaluated failure scenarios. By determining how much flow may be assigned to each cable in order to satisfy network demand, while providing tolerance to each of the failure scenarios, the network flow assignor enables the capacity planning system to identify how much capacity is needed at each cable, for the various time periods, to satisfy the routing constraints.

The capacity provisioning optimizer 348 can be configured to optimize how capacity is added to the backbone network. As described herein, the network flow assignor 346 identifies how much capacity is needed at each cable for the various time periods to satisfy the network constraints (e.g., is able to satisfy the demand between nodes at each time period and is tolerant to the evaluated fault scenarios). The capacity provisioning optimizer determines how best, based on costs and characteristics of each cable, to add or provision the needed capacity to the network over time. In some implementations, the capacity provisioning optimizer evaluates how the network flow assignor assigned network flow to all cables for all time periods. Based on the evaluation, the capacity provisioning optimizer determines when capacity should be added, and in what amount, so that the net present value of all cost expenditures in the capacity provisioning is minimized. For example, each cable is associated, per the network characterization data, with a cost for when the cable becomes operational and a cost the time periods during which the cable is utilized in the backbone network. In some implementations the upfront and recurring costs are comprised of a fixed amount and a variable amount, where the variable amount is based on the amount of provisioned capacity. Based on those values, the capacity provisioning optimizer determines a capacity provisioning plan that may be implemented over the evaluated time period. In some implementations, the capacity provisioning optimizer formulates the optimization as a multi-commodity flow problem over time that minimizes the net present value of costs subject to the needed capacities at each cable for each time period. In some implementations, the capacity provisioning plan is constrained based on the asset type of each cable. For example, in some implementations, the capacity provisioning optimizer may not reduce the provisioned capacity of a cable that is an "investment" asset-type.

The report generator 350 may be configured to generate reports based on the identified capacity needs and the optimized capacity provisioning plan. The reports may be used, for example, by network planners to determine how to effectively add capacity to a backbone network or to analyze how different evaluated failure scenarios impact network needs. The generated reports may be both textual (e.g., tables) and graphical (e.g., graphs illustrating network flows). The reports may illustrate, for example, for various time periods, the maximum capacity available at each of the cables, the needed capacity at each of the cables, the amount of provisioned capacity at each of the cables, the amount of new capacity provisioned, and the flow of network traffic under different conditions (e.g., no failures or one or more failure scenarios).

Network Characterization Data for a Network Capacity Planning System

As described below, FIGS. 4-7 illustrate example network supply, cost, demand, and failure data that may be evaluated by the system. Although illustrated in FIGS. 4-7 as being provided to the system in the form of a table, other formats for the data may be used. The data may be entered, for example, into a file or application interface by a network planner using the capacity planning system.

Figure 4:
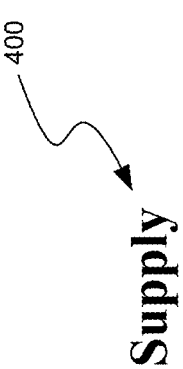
FIG. 4 is a table diagram illustrating example supply data, characterizing a backbone network, used by a network capacity planning system.

FIG. 4 is a diagram illustrating example network supply data 400 that may be evaluated by the system. As described herein, the network supply data 400 characterizes the available network supply, as well as other information, of each cable in the backbone network.

The table 400 includes a cable name field 405 that uniquely identifies each cable in the backbone network. The table 400 also includes an asset type field 410 that defines the asset type of the cable. For example, a cable may be one in which capacity is leased for use in the backbone network. As a further example, a cable may be a full or partial ownership investment by the backbone network operator. As an additional example, the asset type may indicate that the characterized route is a "virtual" cable that spans multiple cables of the backbone network. As described herein, the system may provision capacity from cables differently depending on their asset type.

The table 400 also includes a node A field 415, a node Z field 420, and a route field 425, which together characterize the connectivity of each cable within a backbone network. The node A and Z fields 415 and 420 indicate, for example, backbone network endpoint nodes of each cable. A node may represent a data center in the backbone network, a point-of-presence in the backbone network, or other type of cable terminus. In some embodiments, one of node A field 415 and node Z field 420 represent a source node, and the other of node A and node Z field represent a drain node, such that the supply information (described below) represents the available supply to the drain node from the source node via the cable. In some embodiments, the node A and Z fields are not associated with a source and drain, such that supply information represents the available supply in each direction of the cable (e.g., from node A to node Z and from node Z to node A each have the available supply), or such that the supply information represents the total available supply shared by both directions of the cable.

The route field 425 indicates the cable segments that form the cable route between nodes A and Z. As described herein, each segment represents a single point-to-point undivided path. A cable route connecting two nodes may be made up of one or more segments. Furthermore, a segment may be utilized for multiple different cable routes. For example, as illustrated in FIG. 4, supply data entry 430a indicates that a particular cable connection between nodes "VXE" and "VXA" utilize segment "S3," supply data entry 430b indicates that a particular cable connection between nodes "VXJ" and "VXA" utilize segments "S1" and "S3," and supply data entry 430c indicates that a particular cable connection between nodes "VXD" and "VXB" utilizes segments "S13," "S15," and "S16." In the above illustration, the segment "S3" is used in a cable route to connect nodes "VXE" and "VXA," as well as in a cable route to connect nodes "VXJ" and "VXA." Though not illustrated in FIG. 4, in some embodiments a pair of nodes may be associated with more than one supply data entry, each of which corresponds to a different cable connection with a different route. That is, continuing with the example above, the supply data could contain an additional entry for a route connecting nodes "VXE" and "VXA," but the entry indicates a different cable name and/or segments used for the route. In some embodiments, though not illustrated in FIG. 4, a cable route may include segments from another cable. For example, the last segment of a cable route may be a backhaul of a different cable, which is used to connect the characterized cable route to its destination. In such an embodiment, the route field 425 may indicate when a segment belongs to a different cable.

The table 400 additionally includes supply scenario field 440 and failure scenario field 445. The supply scenario field can used to select an asset to be used in a particular run. For example, as illustrated in FIG. 4, the cable "CAB11" of tranche '4' be indicated as being used in run 'A.' The failure scenario can be used to indicate a segment in the corresponding route that should be included in double-failure scenarios. For example, as illustrated in FIG. 4, segment "S5" of cable "CAB11" tranches '5' and '6' may be included in a double-failure scenario.

The table 400 also includes time-period supply availability 435. The time-period supply availability 435 indicates how much network data, for various time-periods, may be provided by the corresponding cable. In some embodiments each time-period may indicate a different fiscal quarter. The time-period supply availability 435 may indicate the available supply in units characterizing the available bandwidth or throughput of a cable, such as gigabits per second ("Gbps.") For example, in the illustrated table 400, the "CAB1" connection between nodes "VXJ" and "VXA" has an available supply of 50 Gbps from the first quarter of 2016 through the third quarter of 2017, and an available supply of 0 Gbps thereafter. As a further example, in the illustrated table 400, the "CAB1" connection between nodes "VXD" and "VXB" has an available supply of 20 Gbps from the first quarter of 2016 through the first quarter of 2017, and an available supply of 30 Gbps beginning at the second quarter of 2017. The time-period supply availability 435 indicates the maximum supply available through the corresponding cable at a particular time period; however, as described herein, not all available supply may be accessible to the backbone network (as access to available supply requires that the supply be provisioned, through a lease or investment, in order to gain access to different levels of supply), and not all provisioned supply may be utilized by the backbone network in all circumstances.

Figure 5:
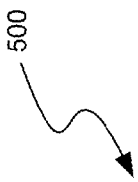
FIG. 5 is a table diagram illustrating example cost data, characterizing the cost of operating a backbone network, used by the network capacity planning system.

FIG. 5 is a diagram illustrating example network cost data 500 that may be evaluated by the system. In the example described herein, the network cost data 500 characterizes the financial costs associated with establishing and using cables at different levels of provisioned supply. For example, the network cost data 500 can characterize the upfront financial cost, corresponding to when the cable becomes operational, as a capital expenditure. As an additional example, the network cost data 500 can characterize the recurring financial cost, for various time periods that the cable is utilized, as an operating expenditure. The network cost data 500 can be based on other types of costs associated with backbone network operation, including the varying difficulty of provisioning and utilizing various cables, time delays associated with provisioning various cables, and other factors that contribute to various cables being more or less favored than other cables. The network cost data 500 is used by the system to determine a cost-effective supply provisioning plan.

The table 500 includes a cable name field 505 that uniquely identifies each cable in the backbone network. The table 500 also includes an asset type field 510 that defines the asset type of the cable. For example, a cable may be one in which capacity is leased for use in the backbone network. As a further example, a cable may be a full or partial ownership investment by the backbone network operator. As described herein, cables may be associated with different financial information, or the financial information may be used by the system differently, depending on the asset type of the cable.

The table 500 also includes a cable capital expenditure 515 and a cable operating expenditure 520. The cable capital expenditure 515 represents the one-time upfront cost incurred during the time period when the cable becomes operational (e.g., a capital expenditure). In other words, a cable capital expenditure 515 charge may only accrue corresponding to the capital expenditure amount at the time period (e.g., fiscal quarter) during which a cable is first operational. The cable operating expenditure 520 represents the recurring costs incurred for the various time periods during which the cable is utilized (e.g., an operating expenditure). For example, a cable operating expenditure 520 may accrue each fiscal quarter during which supply is provisioned from a cable. The cable capital expenditure 515 and cable operating expenditure 520 may both be fixed, in that whether a charge is incurred depends on when the cable becomes operational or whether supply is provisioned from the cable (respectively), but the charge amount does not depend on the amount of supply provisioned from the cable.

The table 500 also includes a turnup capital expenditure 525 and a turnup operating expenditure 530. Like the cable capital expenditure 515 and the cable operating expenditure 520, the turnup capital expenditure 525 and the turnup operating expenditure 530 may, respectively, be incurred at the time period at which a cable becomes operational and during each time period when supply is provisioned from the cable. However, unlike the fixed charges associated with the cable capital expenditure 515 and cable operating expenditure 520, the amount of charge incurred corresponding to the turnup capital expenditure 525 and turnup operating expenditure 530 varies based on the amount of supply provisioned from a cable during each time period. In other words, as more supply is provisioned from a cable, the turnup costs incurred for using the cable increase. For example, referring to table 500, the cable "CAB1" connecting "VXE" and "VXA" corresponds to a turnup operating expense of "$9.0," which may indicate a cost in thousands or millions of dollars (or other) per Gbps of provisioned supply. Thus, each additional Gbps provisioned from the cable would lead to a corresponding increase in the amount incurred for that time period.

The table 500 also includes a price compression field 535, a bundling field 540, and an initial capacity field 545. The price compression field 535 indicates the price discount per year for a cable. The bundling field 540 captures the fact that there are efficiency factors that relate to routing based on the size of a cable. For example, as illustrated in FIG. 5, some of the cables have a bundling factor of 10, while other cables have a bundling factor of 100. The initial capacity field 545 captures the sunk cost of a cable corresponding to capacity already paid for.

FIG. 6 is a diagram illustrating example network demand data 600 that may be evaluated by the system. As described herein, the network demand data 600 characterizes the traffic needs between different components of the backbone network for different time periods. The system uses the network demand data 600 to determine how much network traffic should be routed through cables to satisfy the demand needs, and accordingly, how much supply should be provisioned from each cable.

The table 600 includes a source field 605, a destination field 610, a time period field 615, and a traffic demand field 620. Each entry of the network demand data 600 indicates how much network traffic (as indicated by traffic demand field 620) the backbone network needs to be capable of routing from the node identified in the source field 605 to the node identified in the destination field 610 during the time period (e.g., fiscal quarter) identified in the time period field 615. In contrast with the network supply data 400, the network demand data 600 is not associated with any individual cables; the demand data characterizes how much network traffic the backbone network must be capable of delivering from one node to another, but does not specify the route or cables that should be used. As described herein, the system uses the network supply data 400 and network cost data 500 (and additionally, the network failure data 700) to determine how to satisfy that demand.

FIG. 7 is a diagram illustrating example failure data 700 that may be evaluated by the system. As described herein, the failure data 700 describes hypothetical failure scenarios that may occur in the backbone network. Each failure scenario, which could be the result of a natural disaster, human error, or other, results in the inoperability of one or more segments associated with the failure scenario. The system uses the failure data 700 to generate a fault-tolerant traffic provisioning plan that can satisfy network demand needs under any of the listed failure scenarios.

The table 700 includes a failure ID field 705 that uniquely identifies each failure scenario in the failure data. The table 700 also includes a description 710 that describes the event characterized by the failure scenario. For example, a failure scenario may characterize what would happen if an earthquake were to occur nearby a particular city or what would occur if there was equipment failure associated with a particular cable. The table 700 additionally includes a failure list 715 that recites which network failures the system will evaluate for a failure scenario. The failure list 715 may specify network failures on a segment level. For example, example failure scenario 720a specifies that segments "S3," "S10," "S13," and "S19" will be treated as failed, and example failure scenario 720b specifies that segments "S10," "S9," "S5," and "S10" will be treated as failed. As described herein, the system will treat failed segments as being unable to carry any network traffic in the backbone network. Furthermore, since multiple cables may share a segment (for example, as indicated in the route field 425 of the supply data 400), a single segment failure may result in the failure of more than one cable.

Flows for a Network Capacity Planning System

Figure 8:
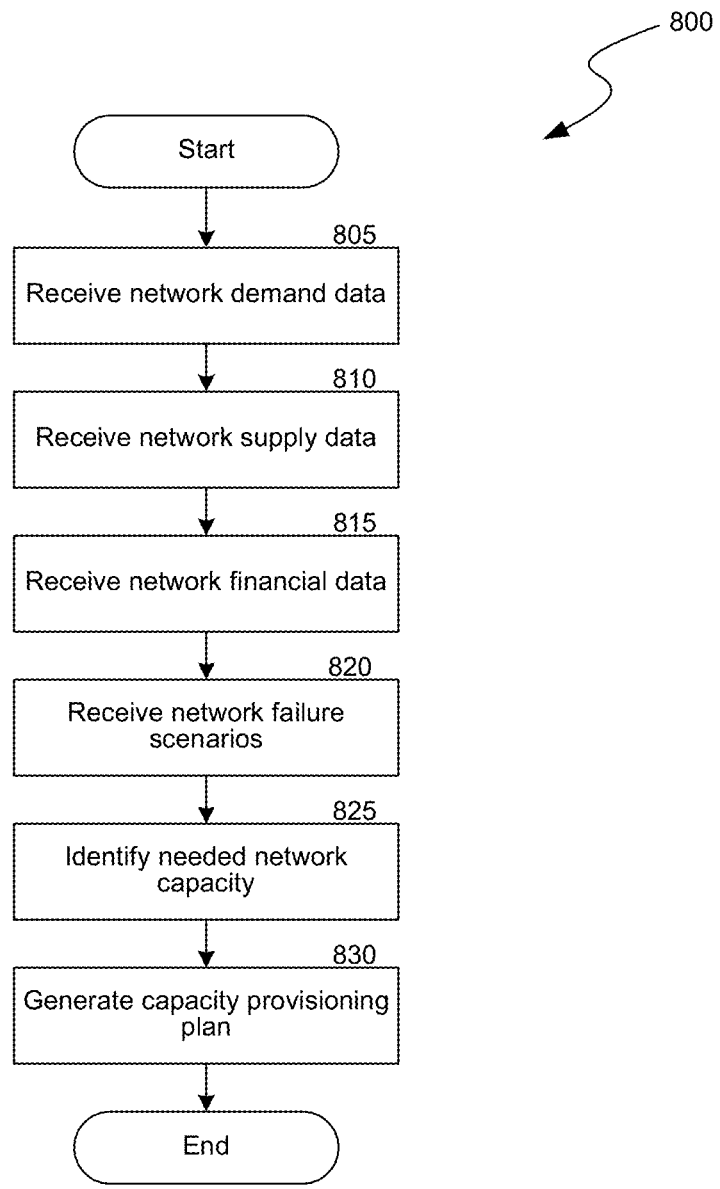
FIG. 8 is a flow diagram illustrating a process, used in some implementations of a network capacity planning system, for generating a capacity provisioning plan.

FIG. 8 is a flowchart illustrating an example process 800, implemented by the capacity planning system, for generating a capacity provisioning plan. As described herein, a capacity provisioning plan describes how capacity may be added to a backbone network in a manner that satisfies forecasted long-term network demand, is tolerant to evaluated network failure scenarios, and is cost effective. Broadly characterized, the process 800 first receives, at blocks 805 through 820, data characterizing different aspects of a backbone network (e.g., supply, demand, and costs) and failure scenarios that must be accounted for. Then at blocks 825 and 830, the process 800 determines how network flow should be allocated to cables within the backbone network to satisfy demand while providing fault-tolerance, and optimizes how the capacity to provide the needed flow should be added to the backbone network over time.

At a block 805, the system receives network demand data, which characterizes forecasted long-term network demand over future time periods. The network demand data may, for example, be in the form of the network demand data 600 illustrated in FIG. 6. Each forecasted network demand projection in the network demand data includes a first node in the backbone network, a second node in the backbone network, a time period, and a projected network demand associated with the first and second node for the time period. The network demand data, as well as the data described below received at blocks 810-820, may be entered by a user of the capacity planning system, retrieved from a file record of previously forecasted data, or other.

At a block 810, the system receives network supply data, which characterizes network connectivity in a backbone network and the forecasted available supply over future time periods. The network supply data may, for example, be in the form of the network supply data 400 illustrated in FIG. 4. Each forecasted supply projection in the network supply data includes a cable comprised of at least one segment, a first node in the backbone network, a second node in the backbone network, a time period, and an available capacity of the cable for the time period.

At a block 815, the system receives network cost data, which characterizes the costs of operating different components of the backbone network for different time periods. The network financial data may, for example, be in the form of the network cost data 500 illustrated in FIG. 5. The network financial data includes, for at least some of the cables in the backbone network, a capital expenditure amount and an operating expenditure amount.

At a block 820, the system receives failure data describing different failure scenarios. The failure data may, for example, be in the form of the failure data 700 illustrated in FIG. 7. The failure data includes, for at least some of the failure scenarios described by the failure data, a failing segment.

At a block 825, the system identifies, based on the received network characterization and failure data, how much network capacity is needed throughout the backbone network for at least some of the evaluated time periods. The per-cable network capacity is generated by the system so as to provide sufficient capacity for the time periods that satisfies the network demand of that time period. The operation of block 825 is described in greater detail in FIG. 9.

Figure 9:
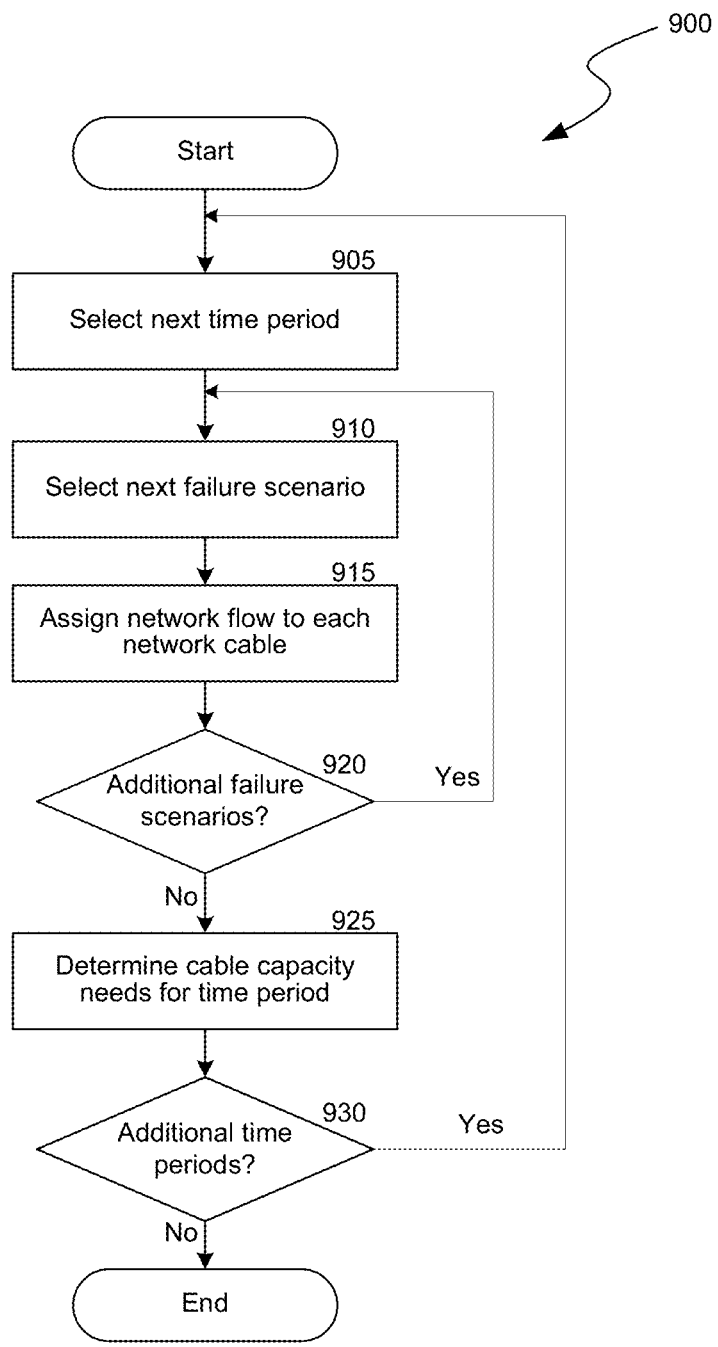
FIG. 9 is a flow diagram illustrating a process, used in some implementations of a network capacity planning system, for identifying needed network capacity within a backbone network.

FIG. 9 is a flow diagram illustrating a process 900 for determining needed capacities for at least some of the cables in a backbone network, at various time periods, based on network flow assignments performed by the system. Although the process 900 illustrates one approach for determining needed capacities, based on separate evaluations of different failure scenarios at different time periods, other evaluative approaches may be used. For example, as discussed below, the entire problem space may be modeled with a linear program, and the determination of needed capacities for all time periods may be solved concurrently. Other evaluative techniques may be used in place of the process 900 that do not require the concurrent solving of the entire problem space.

At a block 905, the system selects the next time period for evaluation. As described herein, network supply and network demand data characterize the backbone network for different time periods, such as successive fiscal quarters. The system will evaluate network capacity needs with respect to each of the time periods found in the network supply and network demand data.

At a block 910, the system selects the next failure scenario from the failure data. As described herein, the failure data may include multiple failure scenarios, each of which define cable segments that will be treated as failing for that failure scenario.

At a block 915, the system assigns network flow to each of the cables in the backbone network based on the selected time period and the selected failure scenario. To assign network flow to the cables, the system identifies the backbone network cables that include a failing segment from the currently selected failure scenario; those identified cables will be treated as failed, and therefore unable to carry any network traffic. The system then determines how much traffic is to be carried through each of the remaining operational cables such that all of the network demands for the selected time period are concurrently satisfied. However, the system may not assign flow that would exceed a cable's available supply for that time period (as indicated by the supply data). Thus the "assigned flow" of block 915 does not model or predict any particular traffic that would be routed through a given cable; rather, it provides a quantity of capacity that, if provided by each of the operational cables, would be able to concurrently satisfy all network demands between nodes. To determine how to assign flow for the selected demand and failure scenario, the system may model the problem space as a linear program.

At a decision block 920, the system determines whether there are any additional failure scenarios in the failure data. If there are additional failure scenarios, the process returns to the block 910 so that the system may select the next failure scenario and assign network flow based on that failure scenario. If there are no additional failure scenarios, the process continues to a block 925.

At the block 925, the system determines how much capacity is needed at each of the cables for the currently selected time period. The capacity needed at a cable is based on the flow assigned to the cable across the different selected failure scenarios. For example, the needed capacity of a cable for the currently selected time period, as determined by the block 925, may be the maximum of each of the flows assigned to that cable given the different selected failure scenarios. The needed capacity for the currently selected time period reflects the amount of capacity that, if available, would enable a cable to satisfy all network demands of that time period across all evaluated failure scenarios.

At a decision block 930, the system determines whether there are any additional time periods in the network supply and demand data. If there are additional time periods, the process returns to the block 905 so that the system may select the next time period and determine the needed network capacities that would satisfy time period network demands for all failure scenarios. Otherwise, the process 900 exits.

Although process 900 is shown for illustrative purposes as separately evaluating each combination of time period and failure scenario, and assigning network flow based on an individualized evaluation of each, the system may assign flow in other manners. For example, the system may model the problem space with a linear program, with flow variables for each of the cables in the backbone network, the time periods being evaluated, and the different failure scenarios. The linear program may be constrained to satisfy flow conservation (e.g., the backbone network traffic going into a node equals the backbone network traffic going out of the node), capacity constraints (e.g., the flow through a cable does not exceed the available capacity of that cable at that time period, as indicated by the supply data), and that all demand requirements are met.

Returning to FIG. 8, at a block 830 the system generates a capacity provisioning plan based on the identified network capacity needs. As compared to the identified network capacity needs, which describe at minimum how much capacity the backbone network needs access to from each network cable at each time period (for example, to satisfy a time period's network demand), the capacity provisioning plan describes how best to add the needed capacity to the backbone network over time. To generate the capacity provisioning plan the system will evaluate the identified network capacity needs. The system will further evaluate the financial data associated with the cables, which describes the one-time upfront costs and the recurring costs for cable use. The system may then determine an optimized plan for adding capacity to the network while minimizing costs. By generating an optimized plan for provisioning network capacity after identifying network capacity needs for every forecasted time period, the system is able to look at the entire forecasted period and determine the best way to add provisioned capacity to the backbone network that minimizes costs while improving reliability.

To determine how much capacity should be provisioned from a cable at each time period, the system may model the optimization problem as a minimum cost multi-commodity flow problem over time. That is, the system may generate the provisioning plan that satisfies a modeling constraint that all network demand needs must be satisfied at each time period, under each failure scenario, while minimizing the net present value of costs expenditures (based on the financial data) for implementing the provisioning plan. For example, the system may attempt to minimize the total value of all expenditures (capital and operating) required. To do so, the system may minimize the total cost associated with all cables in the backbone network, based on the capital expenditure amount associated with each cable, the operating expenditure amount associated with each cable, and the number of time periods during which capacity is provisioned from the cable. If the financial data for a cable further includes turnup costs, in which the capital and operating expenditures for a cable vary based on the capacity provisioned from the cable in a time period, the system will further consider those values to minimize costs. As a further example, the system may attempt to identify instances in which expenditures can be deferred.

In addition to minimizing the total costs and net present value of costs for implementing a capacity provisioning plan, the system at the block 830 may additionally generate a capacity provisioning plan that adheres to certain constraints. For example, as described above, a cable in the backbone network may be characterized as an investment asset type or a lease asset type. The system may be constrained in how additional capacity is provisioned from a cable, or how less capacity is provisioned in subsequent time periods, based on the asset type of the cable. For example, the system may be required to generate a capacity provisioning plan such that once a certain amount of capacity is provisioned from an investment type cable, at least that amount of capacity must be provisioned from the cable during subsequent time periods. After generating the capacity provisioning plan at the block 830, the process 800 ends.

Other objectives may be considered, and other constraints adhered to, by the system when generating an optimized provisioning plan. For example, the system may optimize a provisioning plan with the objective of minimizing network latency in the backbone network, minimizing the total capacity used in the backbone network, minimizing the amount of excess or unused capacity in the backbone network, and the benefit if one were to lease or swap unused capacity. Combinations of objectives may be evaluated by the system by computing weighted averages of expressions corresponding to the different objectives, or by constraining the system to require that certain objectives' requirements be met.

Generally, the capacity provisioning system can consider any objective or impose any constraint that can be expressed mathematically. For example, a network planner may wish to impose the constraint that any generated provisioning plan allocates more capacity to a cable A than the sum of capacities allocated to a cable B and cable C. To enforce the constraints, the network planner may add a corresponding mathematical expression. It will be appreciated that other mathematical expressions concerning the different cables, the maximum capacities allocated to cables, the minimum capacities allocated to cables, the relationship between amounts of capacity allocated to different cables, and the timing of allocations may be used.

Illustrative Outputs of a Network Capacity Planning System

The capacity provisioning plan, such as one generated by the process 800, describes for various time periods how much capacity a network planner should provision from each cable in the backbone network. The network capacity planning system may additionally generate reports that describe aspects of the capacity provisioning plan. FIGS. 10 through 15 illustrate example graphical reports that may be generated by the system.

Figure 10:
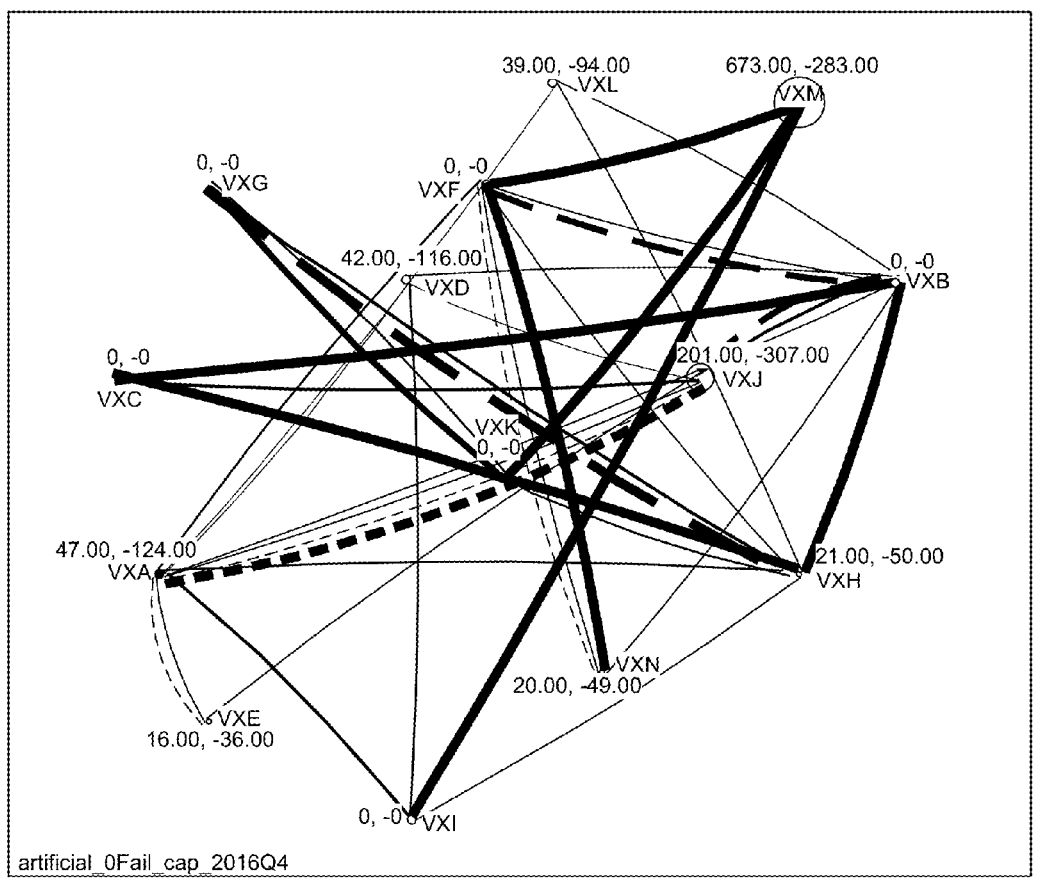
FIGS. 10-15 illustrate example graphical reports generated by the network capacity planning system.
Figure 11:
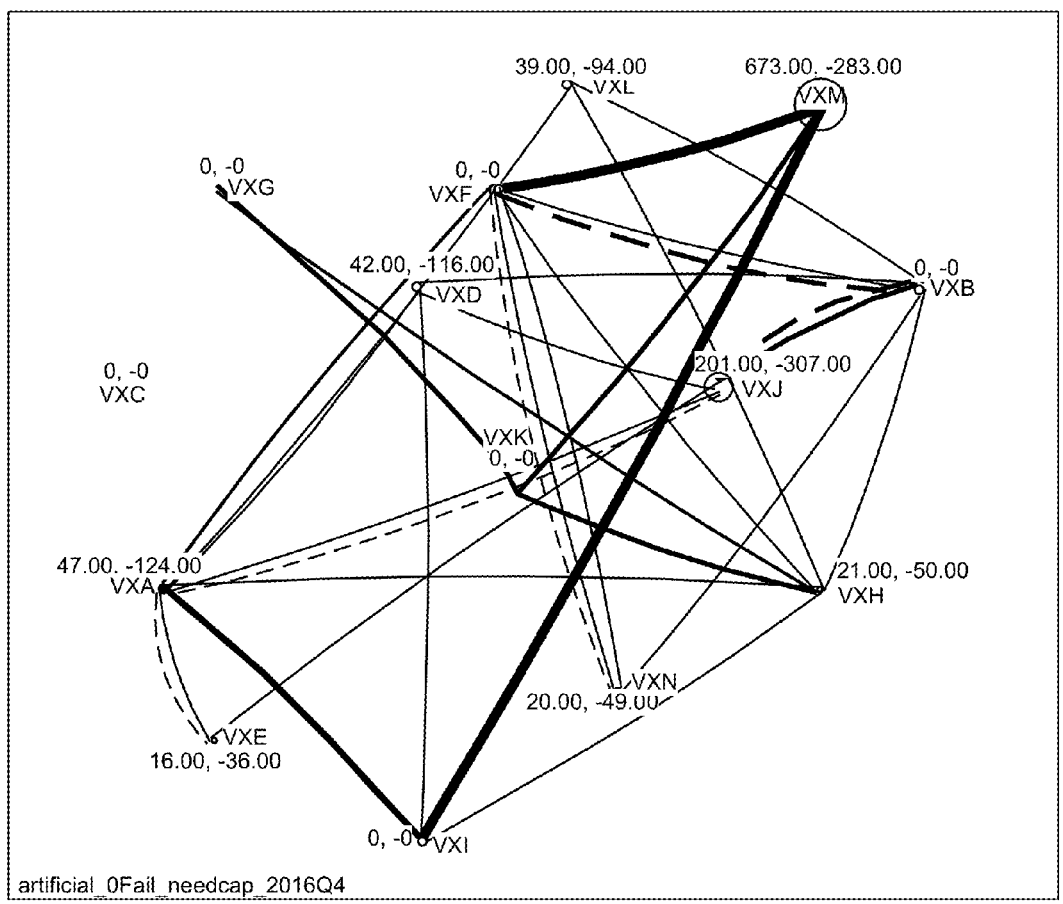
Figure 12:
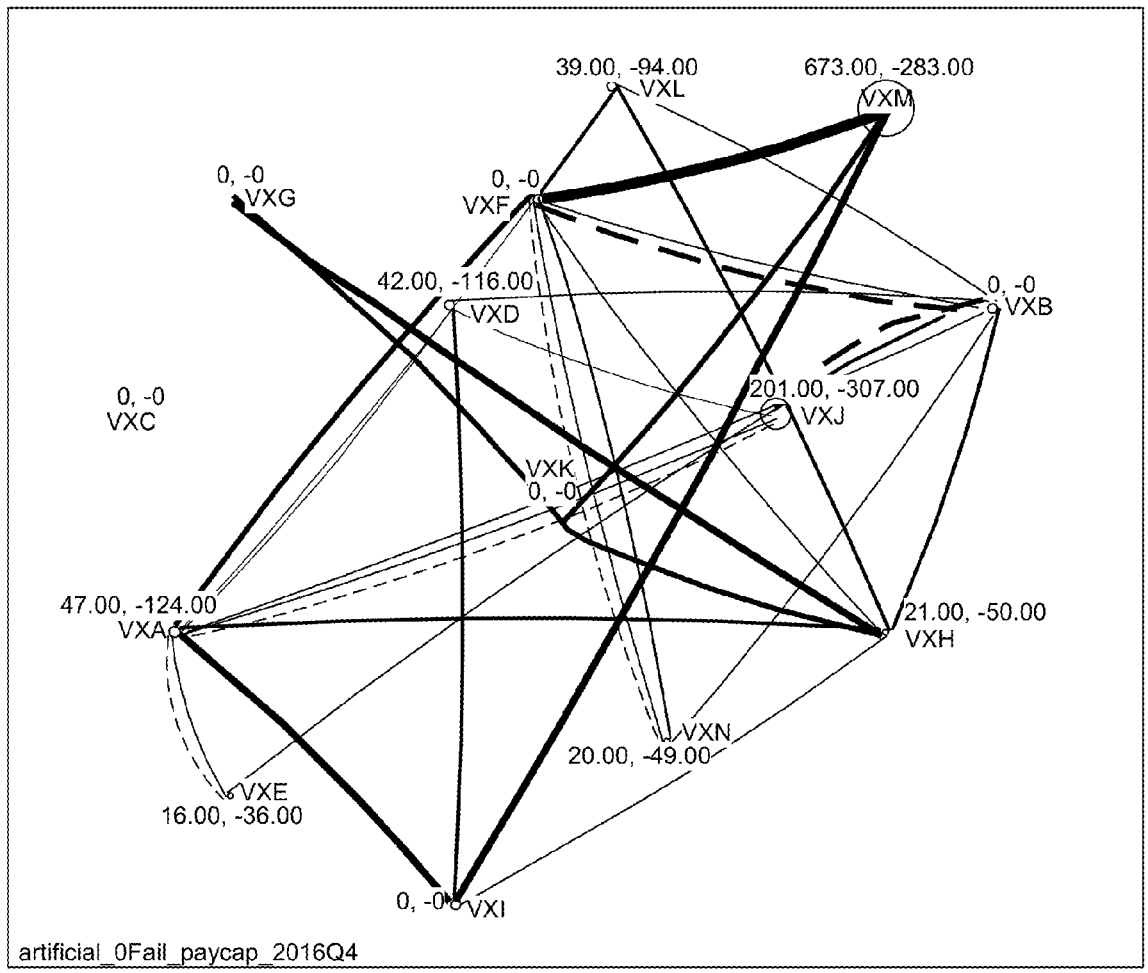
Figure 13:
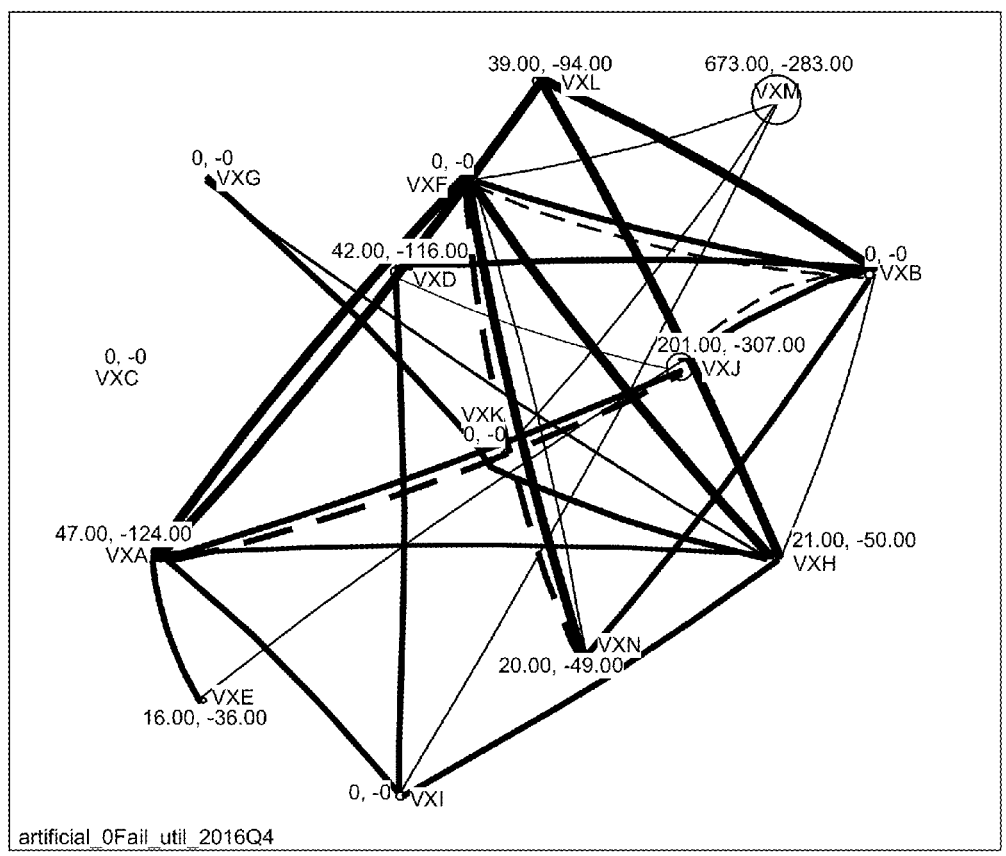
Figure 14:
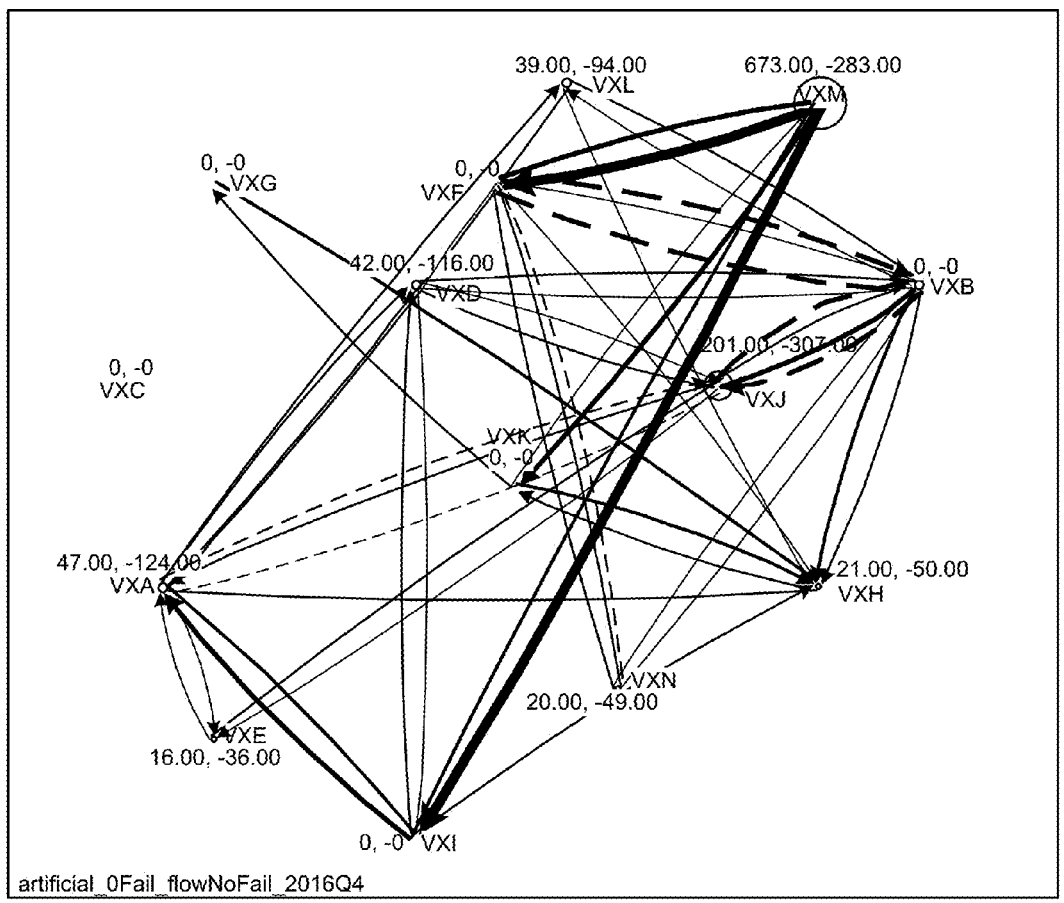
Figure 15:
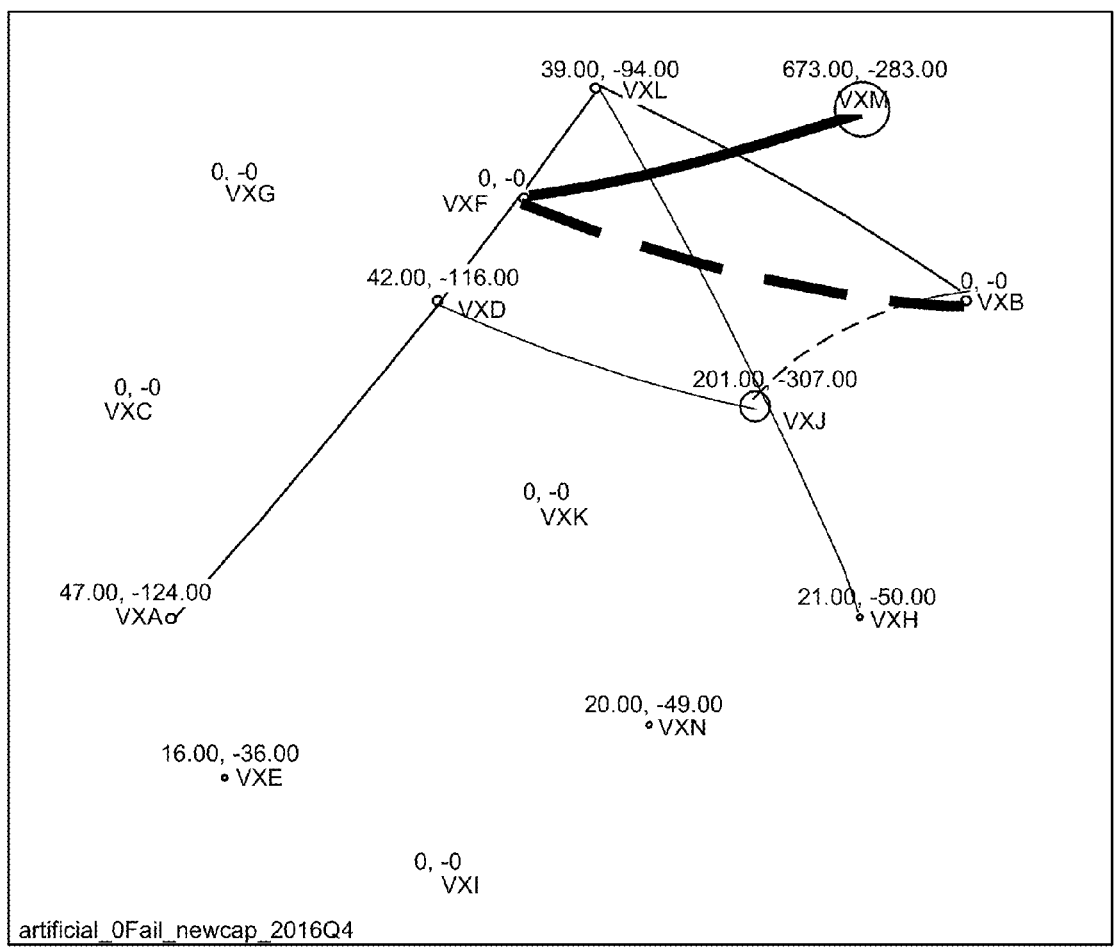

FIG. 10 illustrates an example graph depicting, for a sample network, the capacity available in network cables during a particular time period (e.g., "2016Q4"). FIG. 11 illustrates an example graph depicting, for a sample network, how much capacity is needed at each of the cables to satisfy the network demands for a particular time period. FIG. 12 illustrates an example graph depicting, for a sample network, how much capacity should be provisioned, or paid for, during a particular time period. FIG. 13 illustrates an example graph depicting, for a sample network, the utilization of cables during a particular time period. FIG. 14 illustrates an example graph depicting, for a sample network, how traffic may flow through the network during a particular time period for a specific failure scenario (e.g., "NoFail"). And FIG. 15 illustrates an example graph depicting, for a sample network, how much additional capacity should be provisioned at a particular time period.

Conclusion

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology.

In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method in a computing system, comprising:
   receiving, at a computing system, demand data characterizing network demand projections for a backbone network, the demand data comprising, for each demand projection, a first node in the backbone network, a second node in the backbone network, a time period, and a projected network demand associated with the first and second nodes for the time period;
   receiving, at the computing system, supply data characterizing network supply availabilities for the backbone network, the supply data comprising, for each supply availability, a cable in the backbone network comprised of at least one segment, a first node in the backbone network associated with the cable, a second node in the backbone network associated with the cable, a time period, and an available capacity associated with the cable for the time period;
   receiving, at the computing system, data characterizing network cable costs for the backbone network, the cost data comprising, for each network cable cost, a cable, an upfront cost amount, and a recurring cost amount;
   receiving, at the computing system, failure data characterizing network failure scenarios, the failure data comprising, for each failure scenario, at least one segment;
   identifying needed capacities for the backbone network by:
      determining, for a set of time periods in the demand data and supply data, a needed capacity for a set of cables in the backbone network by:
         assigning, for at least some of the failure scenarios in the failure data, a network flow to each cable in the set of cables based on the failure scenario, wherein the network flow assigned to a cable is less than or equal to the available capacity for that cable for the time period, and wherein the demand projection for the time period associated with each pair of first and second nodes is satisfied by the assigned flow between the first and second node; and
         determining, for each cable in the set of cables, a needed capacity for the cable for the time period based on the network flows assigned to the cable for each of the at least some failure scenarios; and
      generating, based on the needed capacity for the set of cables at the set of time periods, and the upfront cost amount and recurring cost amount associated with the cables in the set of cables, a capacity provisioning plan comprised of a provisioned capacity for the set of cables at each of the set of time periods; and
   assigning a network flow to each cable included in the set of cables based on the capacity provisioning plan, the assigning satisfying the identified needed capacities for the backbone network.

2. The method of claim 1, further comprising displaying, on a computing system display, an illustration of the provisioned capacity of all cables in the set of cables for a time period.

3. The method of claim 1, further comprising displaying, on a computing system display, an illustration of the needed capacity of all cables in the set of cables for a time period.

4. The method of claim 1, further comprising displaying, on a computing system display, an illustration of the network flow assigned to all cables in the set of cables, based on no failure scenarios, for a time period.

5. The method of claim 1, wherein assigning network flow to each of the cables in the set of cables based on a failure scenario comprises:
   identifying cables comprised of segments associated with the failure scenario; and
   assigning no network flow to the identified cables.

6. The method of claim 1, wherein the supply data further comprises, for each supply availability, an asset type characterizing the cable, wherein the asset type may be an investment or a lease, and wherein determining the provisioned capacity for a cable characterized as an investment comprises, for each time period from the set of time periods, setting the provisioned capacity for the cable to greater than or equal to the cable's provisioned capacity for all previous time periods.

7. The method of claim 1, wherein determining the provisioned capacity for each cable in the set of cables for the set of time periods comprises optimizing how much capacity is provisioned from each cable at each time period to minimize a total of costs associated with the set of cables, wherein the cost associated with a cable is based on (1) the upfront cost amount for the cable and (2) the recurring cost amount for the cable and the number of time periods during which capacity is provisioned from that cable.

8. The method of claim 7, wherein minimizing the total of costs associated with all cables is modeled as a multi-commodity flow problem.

9. The method of claim 7, wherein the upfront cost amount comprises a fixed upfront cost amount and a variable upfront cost amount, wherein the recurring cost amount comprises a fixed recurring cost amount and a variable recurring cost amount, and wherein the variable upfront cost amount and the variable recurring cost amount vary based on the provisioned capacity of a cable at a time period.

10. The method of claim 1, wherein the first nodes in the demand data represent sources, the second nodes in the demand data represent destinations, and the projected network demands in the demand data represent demanded bandwidth from the sources to the destinations.

11. The method of claim 1, wherein the first nodes in the supply data represent sources, the second nodes in the supply data represent destinations, and the available capacities in the supply data represent maximum available bandwidth from the sources to the destinations.

12. The method of claim 1, wherein a time period is a fiscal quarter.

13. The method of claim 1, wherein nodes in the supply data and the demand data represent data centers or points of presence in the backbone network.

14. The method of claim 1, wherein the failure data includes failure scenarios, each comprising a single segment, that collectively include every segment in the backbone network.

15. A system comprising:
one or more physical processors and one or more memories coupled to one or more of the physical processors, the one or more memories comprising instructions operable when executed by the one or more physical processors to cause the system to perform operations comprising:
receiving demand data characterizing network demand projections for a backbone network, the demand data comprising, for each demand projection, a first node in the backbone network, a second node in the backbone network, a time period, and a projected network demand associated with the first and second nodes for the time period;
receiving supply data characterizing network supply availabilities for the backbone network, the supply data comprising, for each supply availability, a cable in the backbone network comprised of at least one segment, a first node in the backbone network associated with the cable, a second node in the backbone network associated with the cable, a time period, and an available capacity associated with the cable for the time period;
receiving data characterizing network cable costs for the backbone network, the cost data comprising, for each network cable cost, a cable, an upfront cost amount, a recurring cost amount;
receiving failure data characterizing network failure scenarios, the failure data comprising, for each failure scenario, at least one segment;

determining, for each time period in the demand data and supply data, a needed capacity for each of the cables in the backbone network by:
assigning, for each of the failure scenarios in the failure data, a network flow to each of the cables based on the failure scenario, wherein the network flow assigned to each cable is less than or equal to the available capacity for that cable for the time period, and wherein the demand projection for the time period associated with each pair of first and second nodes is satisfied by the assigned flow between the first and second node; and
determining, for each cable in the backbone network, a needed capacity for the cable for the time period based on the network flows assigned to the cable for each of the failure scenarios;
generating, based on the needed capacity of each cable in the backbone network for each time period and the upfront cost amount and recurring cost amount associated with each cable, a capacity provisioning plan comprised of a provisioned capacity for each cable at each time period; and
assigning a network flow to each cable in the backbone network based on the capacity provisioning plan, the assigning satisfying the identified needed capacities for the backbone network.

16. The system of claim 15, wherein assigning network flow to each of the cables in the backbone network based on a failure scenario comprises:
identifying cables comprised of segments associated with the failure scenario; and
assigning no network flow to the identified cables.

17. The system of claim 15, wherein the supply data further comprises, for each supply availability, an asset type characterizing the cable, wherein the asset type may be an investment or a lease, and wherein determining the provisioned capacity for a cable characterized as an investment comprises, for each time period, setting the provisioned capacity for the cable to greater than or equal to the cable's provisioned capacity for all previous time periods.

18. The system of claim 15, wherein determining the provisioned capacity for each cable in the backbone network for each time period comprises optimizing how much capacity is provisioned from each cable at each time period to minimize a total of costs associated with all cables, wherein the cost associated with a cable is based on (1) the upfront cost amount for the cable and (2) the recurring cost amount for the cable and the number of time periods during which capacity is provisioned from that cable.

19. A computer-readable storage medium storing instructions that, when executed by a computing system, cause the computing system to perform operations comprising:
receiving, at a computing system, demand data characterizing network demand projections for a backbone network, the demand data comprising, for each demand projection, a first node in the backbone network, a second node in the backbone network, a time period, and a projected network demand associated with the first and second nodes for the time period;
receiving, at the computing system, supply data characterizing network supply availabilities for the backbone network, the supply data comprising, for each supply availability, a cable in the backbone network comprised of at least one segment, a first node in the backbone network associated with the cable, a second node in the backbone network associated with the cable, a time period, and an available capacity associated with the cable for the time period;

receiving, at the computing system, cost data characterizing network cable costs for the backbone network, the cost data comprising, for each network cable cost, a cable, an upfront cost amount, and a recurring cost amount;

receiving, at the computing system, failure data characterizing network failure scenarios, the failure data comprising, for each failure scenario, at least one segment;

identifying needed capacities for the backbone network by:
- determining, for each time period in the demand data and supply data, a needed capacity for each of the cables in the backbone network by:
  - assigning, for each of the failure scenarios in the failure data, a network flow to each of the cables based on the failure scenario, wherein the network flow assigned to each cable is less than or equal to the available capacity for that cable for the time period, and wherein the demand projection for the time period associated with each pair of first and second nodes is satisfied by the assigned flow between the first and second node; and
  - determining, for each cable in the backbone network, a needed capacity for the cable for the time period based on the network flows assigned to the cable for each of the failure scenarios; and generating, based on the needed capacity of each cable in the backbone network for each time period and the upfront cost amount and recurring cost amount associated with each cable, a capacity provisioning plan comprised of a provisioned capacity for each cable at each time period; and assigning a network flow to each cable in the backbone network based on the capacity provisioning plan, the assigning satisfying the identified needed capacities for the backbone network.

20. The computer-readable storage medium of claim 19 wherein determining the provisioned capacity for each cable in the backbone network for each time period comprises optimizing how much capacity is provisioned from each cable at each time period to minimize a total of costs associated with all cables, wherein the cost associated with a cable is based on (1) the upfront cost amount for the cable and (2) the recurring cost amount for the cable and the number of time periods during which capacity is provisioned from that cable, and wherein minimizing the total of costs associated with all cables is modeled as a multi-commodity flow problem.

* * * * *